May 4, 1965 S. AMADA ETAL 3,182,333
ELECTROSTATIC HIGH SPEED PRINTER
Filed Dec. 6, 1962 3 Sheets-Sheet 1

INVENTOR.
S. Amada, K. Kubota, K. Kobayashi
BY Y. Okajima & S. Yanbo
Watson, Cole, Grindle & Watson
ATTORNEYS INVENTOR.
S. Amada, K. Kubota, K. Kobayashi,
BY Y. Okajima & S. Yanbo
Watson, Cole, Grindle & Watson
ATTORNEYS INVENTOR
S. Amada, K. Kubota, K. Kobayashi
Y. Okajima & S. Hanbo
BY
Watson, Cole, Grindle & Watson
ATTORNEYS United States Patent Office 3,182,333

Patented May 4, 1965

3,182,333

ELECTROSTATIC HIGH SPEED PRINTER

Sanae Amada, Meguro-ku, Tokyo, Keijiro Kubota, Mitaka City, Tokyo, Kazuo Kobayashi, Kodairamachi, Kitatama County, Tokyo, and Yoshitaro Okajima and Shozo Nanbo, Nerima-ku, Tokyo, Japan, assignors to Nippon Telegraph and Telephone Public Corporation, Tokyo, Japan, a corporation of Japan Filed Dec. 6, 1962, Ser. No. 242,707

Claims priority, application Japan, Dec. 27, 1961, 37/2,940

3 Claims. (Cl. 346—74)

This invention relates to electrostatic high speed printers.

The present invention is to provide a new apparatus for printing at a high speed with static electricity digital code inputs obtained by converting electronic calculator output signals, telegraphic codes or analogous signals without any movable part for printing.

For high speed printing means for digital code inputs, there have already been developed mechanical printing and printing systems using such special electron tubes as charactrons. However, the mechanical printing system has drawbacks in that it is likely to wear, has limited printing speed and is noisy in operation. In the system using special electron tubes, the electron tubes are complicated and costly and the control of beams is also complicated.

On the other hand, when static electricity is used, the operation is simple and sure. A system utilizing static electricity has advantages of little wear and fewer recording parts, thus simplifying conventional systems. Further, according to the present invention, very high speed printing is possible without making the controlling part bulky.

An object of the present invention is ot provide recording apparatus wherein records of characters corresponding to input signals can be obtained very clearly at a high speed.

Another object of the present invention is to provide recording apparatus having no physically moving part for printing.

A further object of the present invention is to provide a highly economical recording apparatus.

Still another object of the present invention is to make it possible to record analog information inputs at a high speed.

In the accompanying drawings.

Figure 1:
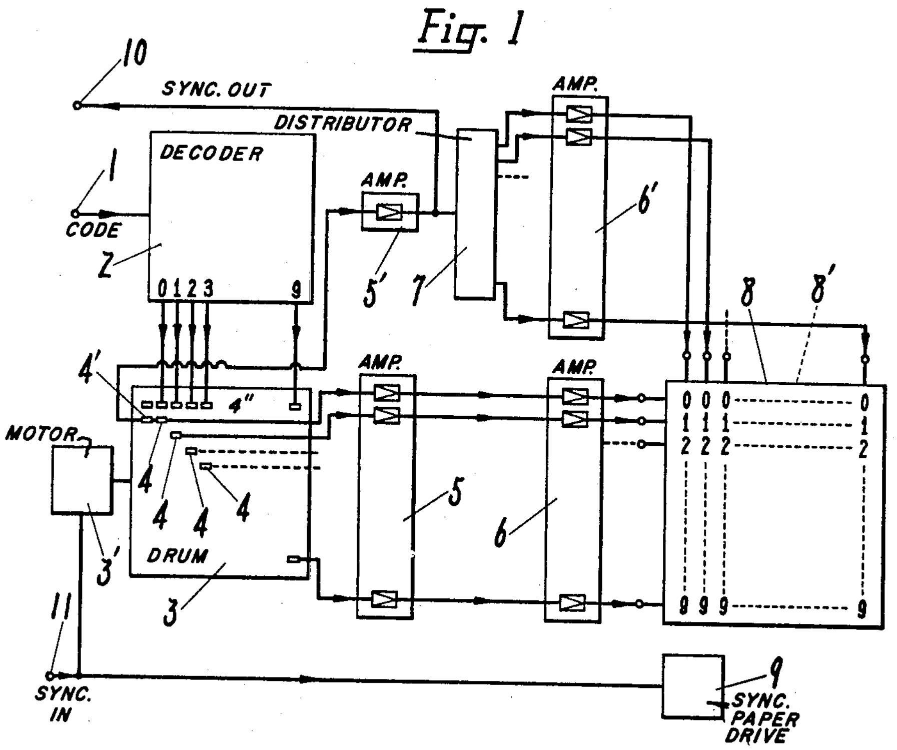
FIGURE 1 is a block diagram showing an embodiment of the controlling section of recording apparatus according to the present invention.

With reference to the drawings, in FIGURE 1 which shows controlling section of the apparatus according to the present invention, 1 is an input terminal for digital codes of electronic calculator output signals or telegraphic codes, 2 is decoder using a diode matrix or the like for generating pulses showing characters in an output circuit corresponding to input codes and 3 is a magnetic drum rotated at a fixed velocity by a synchronous motor 3' to give a required delay time to character pulses. 4 is a recording and reproducing head on a magnetic drum and 4' is a magnetic head for clock time. 5 and 5' are reproducing amplifiers. 6 and 6' are amplifiers for making reproduced pulses high voltage pulses. 7 is a distributor for shifting impressing electrodes one by one with clock pulses and is, for example, a circuit using a discharge tube for a counter. 8 is a character plate and 8' is a back plate provided opposite it. 9 is a driving part synchronizing machine for running an electrostatic recording paper at a fixed velocity. 10 is a clock pulse output terminal for synchronizing the reading velocity of digital input signs. 11 is a synchronous frequency input terminal for synchronizing the magnetic drum 3 and the driving part synchronizing machine 9. For example, a commercial alternating current is applied.

Figure 2:
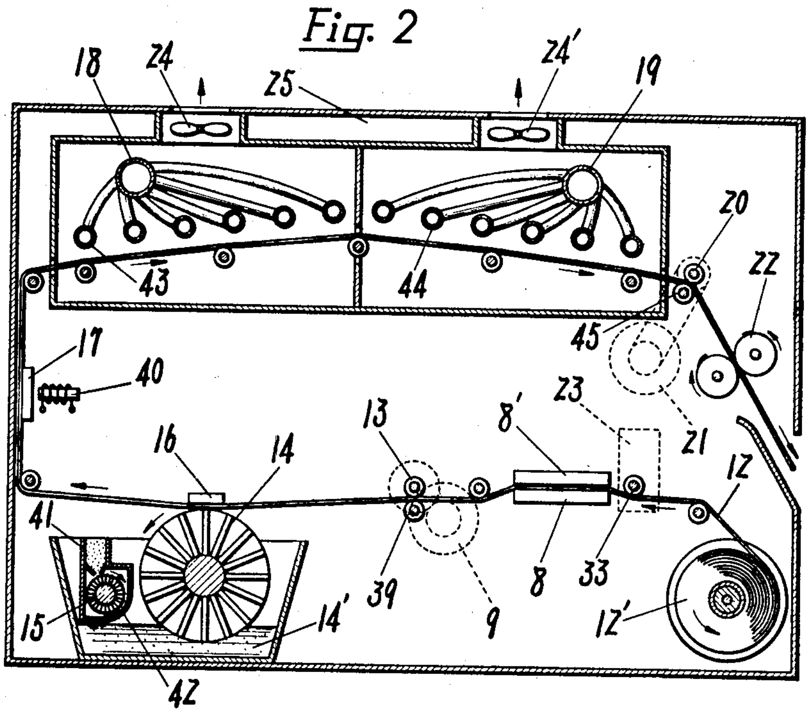
FIGURE 2 is a sectional view showing an embodiment of the recording section of recording apparatus according to the present invention.
Figure 4A:
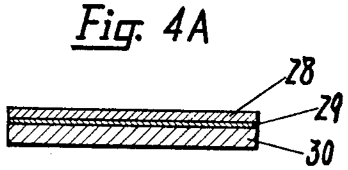
FIGURES 4A and 4B are sectional views of electrostatic recording paper.
Figure 4B:
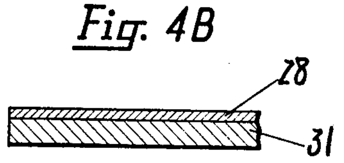
Figure 6:
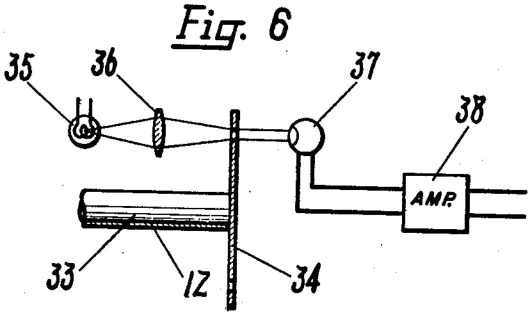
FIGURE 6 is a view showing a rotary detecting part.

FIGURE 2 shows a recording part for the apparatus according to the present invention. 12 is an electrostatic recording paper of which two types are shown in (A) and (B) in FIGURE 4. As shown by 12', this recording paper is wound in the form of a roll and runs along such course as is shown in FIGURE 2. In FIGURE 2, the electrostatic recording paper is wound so that the recording surface (28 in FIGURE 4) may be inside the roll. 8 and 8' are a character plate and a back plate, respectively, as opposed to each other with a gap of about 140$\mu$ between them. 13 is a driving shaft to run the recording paper at a fixed velocity in cooperation with a roller 39 by means of the synchronizing machine 9 and gears. 14, 14', 15 and 16 are developing parts. 15 is a rotary brush provided in a tank 41 for continuously feeding a developing powder into a developing container through slits 42. 14 is a developing magnetic drum in which are radially arranged permanent magnets and which rotates with an iron powder 14' and the developing powder deposited on the periphery. 16 is a pressing member which is to improve the contact between the recording paper and the developing drum and which will move upward so that the developing drum and the recording paper may not be in contact with each other when no record is made. 17 is a vibrating plate having a coil 40 to drop any excess developing powder or deposited iron powder. 18 is a gas burner to fix the developing powder by heating, for example, mixing air and a gas at a ratio of 4:1 and burning the mixture by blowing it out through orifices 43 of about 1 mm. in diameter. 19 is a cooling pipe for cooling compressed air by blowing it out through slits 44. 20 is an auxiliary driving shaft driven by a belt connection from an electric motor 21 so as to cooperate with a roller 45. 22 is a rotary cutter for cutting a recording paper into fixed lengths. 23 is a rotary detecting part for detecting the velocity of the recording paper and consists of a chopper disk 34 (FIGURE 6) directly connected to a rotary shaft 33, a light source 35, a condenser 36, a phototransistor 37 and an amplifier 38. 24 and 24' are fans for exhaust in the fixing part and cooling part, respectively. 25 is a shielding plate for separating the fixing part and cooling part from other parts.

Figure 3A:
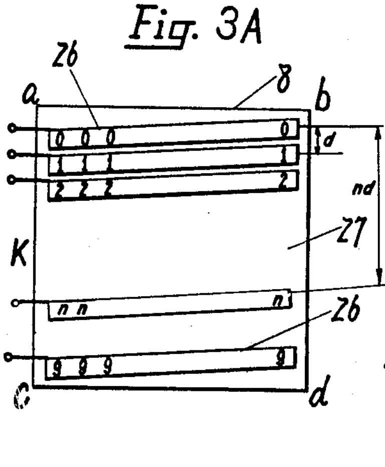
FIGURES 3A and 3B are plan views showing respectively a character plate and a back plate.
Figure 3B:
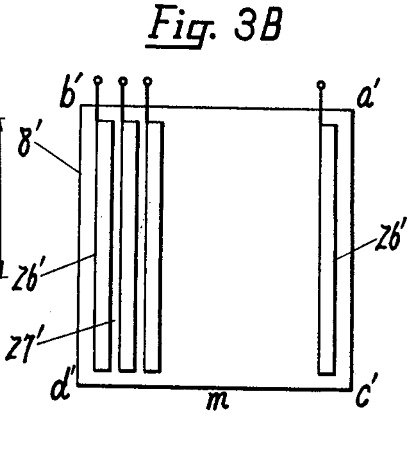

A and B in FIGURE 3 show the construction of the character plate 8 and back plate 8', respectively, shown in FIGURE 1. In the character plate in A in FIGURE 3, K lines corresponding to the number of the kinds of characters are arranged and $n$ characters of the same kind are arranged in each line. The respective lines are arranged at regular intervals and are diagonally arranged and insulated from each other. The characters in each line are of a conductor 26 and are in a conducting state. These characters somewhat project as in ordinary printing types. The printing surfaces of the respective characters are finished to be of a flatness of about 30$\mu$. In the back plate 8' in B in FIGURE 3, $n$ conductors 26' for characters to be printed in each of the above mentioned lines are arranged as insulated from each other at regular intervals. The conductor is as wide as one character and the flatness of the surface of the conductor 26' is the same as of the conductor 26. These plates are to be used so that the corners *a*, *b*, *c* and *d* of the character plate 8 may be opposite the corners *a'*, *b'*, *c'* and *d'* of the back plate 8', respectively.

A and B in FIGURE 4 are sectional views showing two types of the electrostatic recording paper 12 to be used in the present invention. As stated above, this electrostatic recording paper is detailed in the above mentioned patent application. 28 is an insulating layer for holding an electric charge and is a recording surface. 29 is a thin low resistance layer. 30 is an ordinary base. 31 is a base containing a low resistance substance. In either of A and B in FIGURE 4, the insulating layer is about 10$\mu$ thick and each of the layers 29, 30 and 31 is about several tens of $\mu$.

Figure 5:
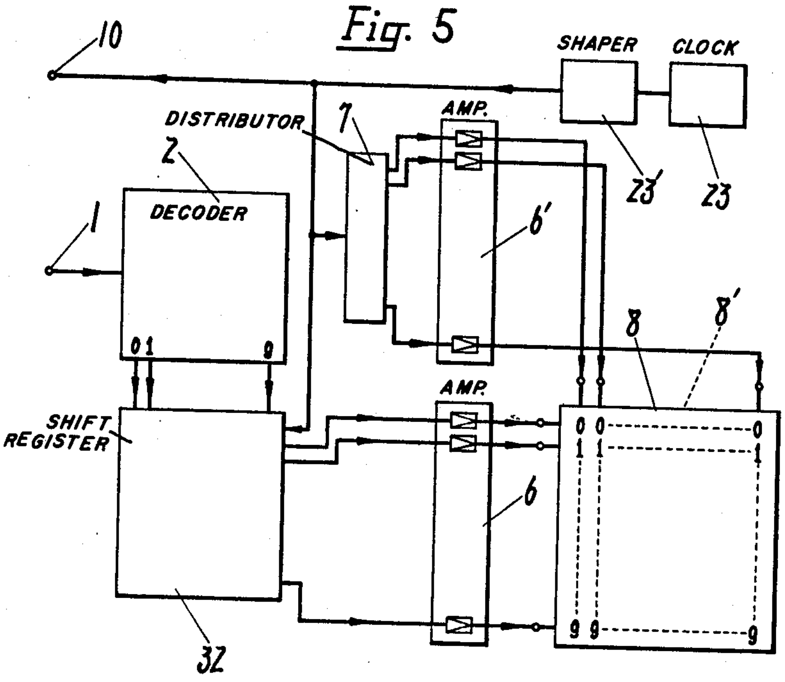
FIGURE 5 is a block diagram of another embodiment of the controlling section of the recording apparatus of the present invention.

FIGURE 5 shows another embodiment of the controlling part of the apparatus of the present invention. 23' is a circuit for making clock pulses, for example, by amplifying and shaping the signal from the rotation detecting part 23 for paper feeding velocity. 32 is a shift register using a core and is to be shifted by clock pulses. 32 may also be equivalent means to delay the time of character pulses utilizing a core memory or a parametron circuit such as used in an electronic calculating machine.

The operation of the apparatus of the present invention shall be explained in the following.

High speed digital code input from an electronic calculating machine output or telegraphic codes is generally fed from a magnetic tape apparatus. The recording apparatus of the present invention can print and record signals at such high speed that printing at a recording speed substantially equal to the tape speed of a magnetic tape apparatus is possible. However, generally, it causes complexity to well synchonize the speeds. It is therefore preferable to use a buffer memory.

The input is of digital codes arranged in the order of recording and will come in as synchronized with clock pulses.

The input digital signal from the input terminal 1 shown in FIGURE 1 will become a single pulse representing a character corresponding to it in the decoder 2. The pulse will be led to the recording head 4'' corresponding to said character, will be recorded on the magnetic drum 3, will be reproduced and amplified by the reproducing head 4 and amplifiers 5 and 6 after a fixed delay period determined by the character and will become a high voltage pulse. The high voltage pulse will be impressed with a positive voltage of about 1000 v. on the conductor of said character of the character plate 8.

When the distance between the adjacent centers of the conductors on the character plate is *d* (mm). and the paper feeding velocity is *v* (mm./sec.), the delay time *nt* (sec.) determined by the character shall be in the following relation:

$$(nt)=n\frac{d}{v}$$

wherein *n* is a number showing that the character is in the *n*th place on the character plate.

Further, the recording and reproducing heads 4 for the character are arranged so that the center angle $\theta n$ formed by them may be $\theta n=v'(1+n)t$ wherein $v'$ is the angular velocity in radians/sec. of the magnetic drum. On the other hand, if the number of characters in one line is *m*, the repeating time $\Delta t$ of clock pulses will be selected so as to be $$\Delta t=\frac{d}{m}=\frac{t}{mv}$$

When the magnetic drum rotates at $v'$, such clock pulse will be generated in the magnetic head 4' for clock time.

The plate on which clock pulses are to be impressed is switched over every pulse by the distributor 7 and the clock pulses are applied to the back plate 8' in turn as a high negative voltage of about 1000 v. Now, if an input is synchronized with clock pulses and comes in as digital codes of "0, 1, 2, 3, . . . " in respect of time, the pulse representing 0 will delay for the time *t* and will be applied to the "0" conductor of the character plate. At this time, if the clock pulse is applied to the conductor at the end (the right-hand end in the drawing), an electrostatic charge pattern of "0" will be obtained at the left end on the electrostatic recording paper.

The next pulse representing "1" will be applied to the conductor of "1" of the character plate as delayed by $t+\Delta t$ from the pulse of "0." At this time, as the time has elapsed by $t+\Delta t$, that is $(m+l)\Delta t$, the clock pulse will be applied to the conductor second from the end of the back plate. At the intersection of both, an electrostatic charge pattern of "1" will be formed in the position next to "0" on the recording paper, because, during $t+\Delta t$, the recording paper will move by $$d'=v(t+\Delta t)=d+\Delta d$$

the conductor 26 of the character plate 8 will be diagonal by *d* with respect to the recording paper, therefore, for the gap of one character, it will be diagonal by $$\Delta d=\frac{d}{m}$$

and thus the electrostatic charge patterns of "0" and "1" will become a record in one horizontal line. Following "2," the results will be the same and the records of "0, 1, 2, 3 . . . " of electrostatic charge patterns will be obtained.

Further, also, in case the input comes in in such random order as "0, 9, 1 . . . ," the pulse of "9" will delay by $9t+\Delta t$ from the pulse of "0," the clock pulse will have elapsed by $(9m+1)\Delta t$, the recording paper will have moved by $9d+\Delta d$ and therefore the electrostatic charge patterns of "0" and "9" will become a record in one horizontal line.

In the process of the electrostatic recording, depending on the contents of input information, the time relation will vary but the printed results will be true to the input information.

According to the steps shown in FIGURE 2, the electrostatic charge pattern printed by said character plate 8 and back plate 8' will first become a visible image due to a fine powder of several $\mu$ composed of a resin and a dye in the developing parts 14, 14', 15 tnd 16. The resin will be fused and secured in the fixing part 18 and will be cooled in the cooler 19. The image may be cut with the cutter 22 and taken out as permanent record sheets.

Here, the electrostatic recording paper 12 will be driven by the slipping auxiliary driving part 20 and the main driving part 13 and will be maintained at a fixed velocity. In starting or stopping, the velocity will be detected with the rotary detecting part 23, a relay not illustrated will be operated in a proper time relation to operate the pressing member 16 for the developing part, electromagnetic valves for a gas and air in the fixing part and spark plugs so that the operation may be stable.

As an example, when the paper feeding velocity is 2.4 m./sec., the distance between the centers of characters is $d=6$ mm., the clock pulse repeating time is 50 $\mu$s., the pulse time is about 10 $\mu$s., the character plate is of +1000 v., the opposed plate is of −1000 v., and the gap between the plates is about 140 $\mu$, a positive electrostatic charge pattern will be obtained on the insulating layer of the electrostatic recording paper and, by using a developing powder of a negative polarity, a clear record of it will be obtained. In case the number of characters in one line $m=50$, the printing velocity will be 400 lines/sec. and 20,000 characters/sec. It has also been confirmed that, by shortening only the pulse repeating time on the same character, it is possible to print 1000 lines/sec. Therefore, by reducing the character distance $d$ or increasing the paper feeding velocity, it is well possible to record about 30,000 characters/sec. That is to say, the present invention provides a very high speed printing means.

In the explanation of the embodiment shown in FIGURE 1, there has been described the case wherein, in order to give a fixed delay time to the character pulse, the magnetic drum 3 is used and the magnetic drum and the paper feeding driving part 9 are synchronized with each other. However, the present invention is not to be limited thereto. That is to say, the delay time can be given even by a device wherein a generally known shift register, memory core or parametron is used. As clock pulses are made from the rotation detecting part 23, the paper feeding velocity needs no high speed synchronism.

The operation of another example shown in FIGURE 5 shall be explained. When the recording paper runs, clock pulses will be generated, input digital codes from the input terminal 1 as synchronized with them will be applied to the decoder 2 and pulses corresponding to characters will be made. The character pulse will be delayed by the time unit required for the character by means of a shift register 32 shifted by clock pulses and will be impressed as a high voltage pulse on the character plate 8 through the amplifier 6. On the other hand, the clock pulse will be applied as a high voltage pulse in turn to the back plate 8' through the shifter 7 and amplifier 6'. As the paper feeding velocity is perfectly synchronized with the clock pulse, an electrostatic charge pattern corresponding to the input information will be obtained on the recording paper. Further, by developing and fixing it through the steps in FIGURE 2, a visible permanent record can be obtained.

In the embodiment shown in FIGURE 1, the repeating time $\Delta t$ of the clock pulse is stated to be $$\Delta t=\frac{t}{m}$$

But it is not a requirement of the present invention. That is to say, in the embodiment shown in FIGURE 5, even if $\Delta t$ is selected to be $$\Delta t<\frac{t}{m}$$

when the input information and control system perfectly synchronize with the clock pulses and the clock pulse generating part rests for the time $(t-m\Delta t)$ after delivering the clock pulses of the number of characters in one line and operates as if it were a step-by-step circuit, the same record will be obtained.

The character plate shown in FIGURE 3 is explained as of the case that the characters are numerals. However, generally the characters may be also ordinary characters, alphabets, signs or lines. Further, when the insulating layer of the recording paper comes into contact with the character plate, the electrostatic charge pattern will become an inverse image of the character on the character plate. Therefore, in order to make the recorded character image in the normal form, the character on the character pattern may be made an inverse image in advance. Further, in the embodiment, a positive high voltage is applied to the character plate and a negative high voltage is applied to the back plate. However, in case, on the contrary, a negative high voltage is applied to the character plate and a positive high voltage is applied to the back plate, a negative electrostatic charge pattern will be made on the recording paper. Therefore, if it is developed with a developing powder of a positive polarity, the same clear record will be obtained.

The characters on the character plate may be insulated one by one, the back plate may be one conductor and earthed, as many delay circuits corresponding to reading heads 4 to the magnetic drum 3 as the characters $n$ in one line may be prepared and the input signals may be made pulses corresponding to the characters by means of the decoder 2. In such case, the number of the delay circuits will increase in proportion to the number of the characters in one line. But, if the input signals are memorized line by line and are applied simultaneously to the delay circuits, parallel records will be obtained. Further, in the above mentioned case, even if the character plate is made an integral conductor and is earthed, the back plate is made insulated electrodes of a size of one character each and character pulses corresponding to the input signals are applied to them, electrostatic charge patterns of the characters will be obtained on the recording paper.

In the explanation of the present invention, there is described an embodiment of a magnetic drum using a developing powder and an iron powder. However, the present invention is not to be limited thereto. There can be applied such methods used in electronic photography as, for example, a developing method by using a developing powder in the form of a spray, a cascade developing method by using a developing powder and glass balls of several tens of $\mu$ and a liquid developing method by suspending a developing powder.

Fixing by a heating method by burning a gas is explained. But it may be by any other methods such as, for example, heating with infrared-ray lamps or with electric heaters. Further, it may be a fixing method by blowing a bonding resin in the form of a spray without heating.

In the explanation of the present invention, it is described to give a required delay after making the input signal into a pulse representing the character. However, the present invention is not to be limited thereto. That is to say, after the delay time required for the character of the input signal, a high voltage may be impressed on the character plate.

In the embodiment shown in FIGURE 1, the high speed recording of the input of digital codes is described. However, the present inventon is not to be limited thereto. The input may be of pulse signals obtained by converting analog information. That is to say, when the input is of a wave form which varies with time, if it is sampled with clock pulses so that, whenever a pulse voltage is impressed on the conductor of the character plate displaced by the position corresponding to the amplitude of the wave form, a clock pulse may be applied to the back plate, an electrostatic charge pattern similar to the original information will be obtained in the lateral direction on the electrostatic recording paper as its intersection.

Further, if the original information is sampled with the time of the clock pulse for one line and the position in the direction of the line of the character plate to be impressed in response to the level of the input is predetermined, an electrostatic charge pattern similar to the original information will be obtained in the lateral direction on the electrostatic recording paper. The conductors of both character plate and back plate may be fine wires. The more the wires, the more beautiful the obtained record. Further, if the input analogous information is sampled with the time for one line of clock pulses, a pulse representing a single position corresponding to its amplitude is made and is applied to the character plate and a clock pulse is applied to the back plate, a wave form will be obtained with the movement of the recording paper also by the record of the intersection. In such case, the character plate may be one fine conductor.

According to the present invention, the recording paper will move in contact with the character plate, signals can be recorded with voltage impression for a very short time and therefore records true to the character shapes on the character plate will be obtained. Thus, records of characters corresponding to the input signals can be obtained very clearly at a high speed. Further, for printing, there is nothing physically moving and no light is used. Therefore, there is no need of any special electron tube and darkroom. Limiting the recording velocity is only the voltage impressing time of the character pulse. This impressing time has been confirmed to be about 10 $\mu$ s. to obtain records. Further, the number of circuits giving delay time of required character pulses and the number of amplifying circuits of high voltages can be reduced by recording an electrostatic charge pattern at the intersection of the character plate and back plate. Therefore, the present apparatus is economically superior to any conventional apparatus. Lastly, with the apparatus according to the present invention, the input of analogous information can be also recorded at a high speed.

What is claimed is:

1. A high speed electrostatic printer system comprising in combination, means introducing input information, code converting means producing different signals from the input information having unique delays from a reference signal, a character plate having crossed conductors on front and back surfaces disposed to receive recording paper therebetween, one of said conductors forming a series of *n* shaped characters therealong, means distributing high voltage pulses of one polarity to each of the conductors of one surface in a timed sequence representing characters along a printing line, means producing high voltage pulses of the opposite polarity for each distributed pulse to represent selected ones of the shaped characters at a time drived from said signal, means passing a recording paper which will accept a charge continuously between said surfaces, means introducing an indicating powder on the recording paper at charged positions, and means fixing the charge to obtain a permanent record.

2. A system as defined in claim 1, wherein the input information is in the form of digital codes.

3. A system as defined in claim 2, wherein the code converting means include a matrix decoder and a rotatable drum delay device.

References Cited by the Examiner

UNITED STATES PATENTS

| | | | |
|---|---|---|---|
| 3,068,481 | 12/62 | Schwertz | 346—74 |
| 3,076,968 | 2/63 | Schwertz | 346—74 |
| 3,091,762 | 5/63 | Schwertz | 346—74 |
| 3,091,767 | 5/63 | Schwertz | 346—74 |
| 3,130,411 | 4/64 | Schwertz | 346—74 |
| 3,131,256 | 4/64 | Frohback | 346—74 |

IRVING L. SRAGOW, *Primary Examiner.*

UNITED STATES PATENT OFFICE

CERTIFICATE OF CORRECTION

Patent No. 3,182,333 May 4, 1965

Sanae Amada et al.

It is certified that error appears in the above identified patent and that said Letters Patent are hereby corrected as shown below:

Column 1, line 71, "recording and reproducing head" should read -- reproducing head and 4" is a recording head --. Column 3, lines 68 and 69, the formula should appear as shown below:

$$\Delta t = \frac{t}{m} = \frac{d}{mv}$$

Signed and sealed this 19th day of August 1969.

(SEAL)

Attest:

Edward M. Fletcher, Jr.
Attesting Officer

WILLIAM E. SCHUYLER, JR.
Commissioner of Patents